(No Model.)
L. S. KUHN.
MACHINERY FOR COOKING MASHES.
No. 313,432. Patented Mar. 3, 1885.
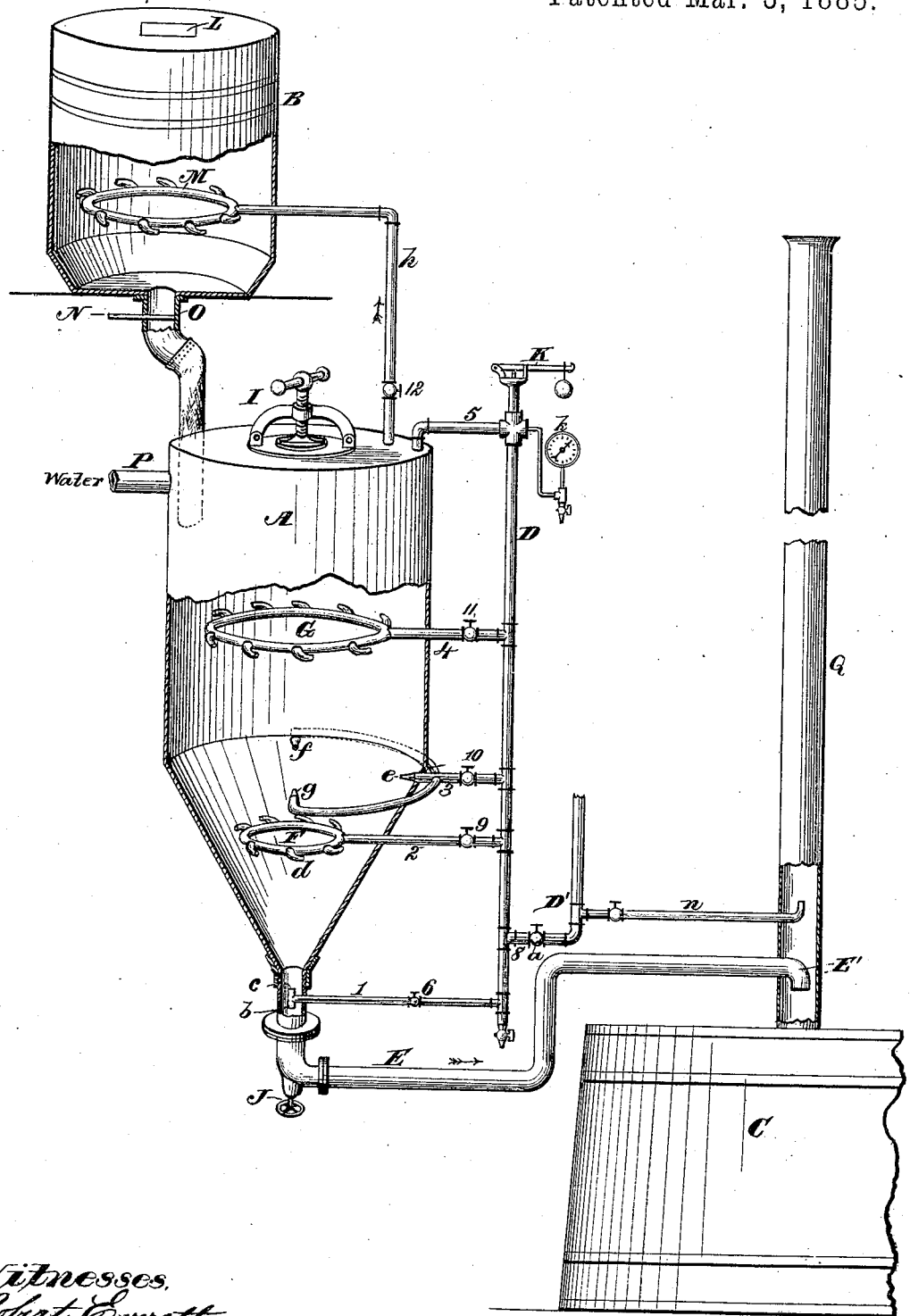
Witnesses
Robert Everett
J. A. Rutherford
Inventor
Leo S. Kuhn
By Wood & Boyd Attys.

UNITED STATES PATENT OFFICE.

LEO S. KUHN, OF CINCINNATI, OHIO, ASSIGNOR OF ONE-HALF TO HOFFMAN & AHLERS, OF SAME PLACE.

MACHINERY FOR COOKING MASHES.

SPECIFICATION forming part of Letters Patent No. 313,432, dated March 3, 1885.

Application filed December 11, 1884. (No model.)

*To all whom it may concern:*

Be it known that I, LEO S. KUHN, a resident of Cincinnati, in the county of Hamilton and State of Ohio, have invented certain new and useful Improvements in Machinery for Cooking and Cooling Mashes, of which the following is a specification.

This invention relates to that class of apparatus for cooking whole grain or cereals to be used in the preparation of mashes for malt and spirituous liquors, in which the cooking operation is performed in a closed vessel by high-pressure steam, and the cooked mass is from said steamer discharged into a mash-tub for saccharification.

The object of the invention is to simplify and expedite the process of cooking whole grain and preparing the same for saccharification by means of an apparatus constructed and arranged in the manner hereinafter set forth.

In the accompanying drawing the figure represents a cooking and mashing apparatus embodying my invention.

The letter A represents a cooker in which the mash is reduced to pulp by the action of steam under pressure.

D represents a steam-pipe supplied by the branch D', leading to a boiler.

$a$ represents a cock for regulating the admission of steam.

1 represents a branch pipe leading into the bottom of the cooker. It is provided with two nippers or orifices, $b\ c$, for ejecting steam upward through the center of the mass and downward through the blow-off pipe E.

2 represents a second branch, supplying a diffusing coil or ring-shaped tube, F, which is provided with a series of discharge-nozzles arranged on said ring F tangentially to the direction of the curve or perpendicular to the radii thereof. In this manner jets of steam are discharged, which tend to give a whirling or rotary motion to the mass contained in the cooker. A curved pipe, $3^2$, arranged on the outside of the cooker connects with the branch pipe 3 of the steam-supply pipe, and is provided with three steam-jet nozzles, $e\ f\ g$, which discharge steam into the cooker at an angle to the jets issuing from the nozzles $d$. Another branch pipe, 4, connecting with the main steam-supply pipe, extends into the cooker at a point above the nozzles $e$, $f$, and $g$, and is connected with a ring-shaped tube, G, having tangential nozzles, which is in all particulars a duplication of the lower ring-tube F. A branch pipe, 5, connected with the pipe D, leads into the top of the cooker to assist in blowing off the charge.

I represents a man-hole secured by a suitable clamping device upon the head, through which the charge is fed into the cooker.

$h$ represents an escape-pipe for leading the steam off.

J represents a blow-off valve in pipe E, which is adapted to be opened and closed, as will be hereinafter explained.

This cooker is designed to carry out two steps or stages of the cooking process. The first step consists in parboiling the grain at a temperature—say of 180°—with the man-hole or escape-pipe $h$ open, so that the cooking is done under the normal pressure of the steam, and then the second step in the process of cooking, finishing the process by closing the man-head and introducing a sufficient amount of steam to bring the pressure up to, say, forty to fifty pounds to the square inch, so as to burst open the cellular tissues of the whole kernels by rapidly heating the water of absorption taken into the grain by the first step of the process, and at the same time to set the mass into rapid whirling motion to assist the disintegration by the attrition of the particles acting upon each other under the pressure of the steam. Thus I have arranged my heating-coils F G on the steam-jets calculated to set the mass in a whirling motion. I have provided additional branches 1 3 for ejecting steam at cross-currents, so as to break up the whirling motion and produce a thorough ebullition. In order to give this motion of the grain different forms of steam-jets may be employed; but the forms of orifices or jets here shown I deem the best to accomplish this purpose.

In order to govern the pressure and regulate the amount of heat employed in the cooker, I have provided a valve, K, and a steam-gage, $k$. The weight on the valve K may be adjusted so as to rise and allow the steam to blow off at the desired degree of steam pressure or heat. This safety-valve K might be placed in a pipe, h, and allow the blowing off to take place through said pipe. During the cooking process the valve J is closed. This valve may be so constructed as to sustain the amount of required pressure in the cooker A, the shell of which should also be constructed of material sufficiently strong to resist the pressure employed in the cooking. When the charge is sufficiently cooked, valve J is opened and the cooked mash is blown off through the pipe E into the mashing-vessel. 6, 7, 8, 9, 10, 11, and 12 represent cocks for controlling the admission of steam into the cooker A. In order to economize steam, I have provided a preliminary cooking-vessel, B, which utilizes the escaped steam employed in the second step of the process to do the parboiling or primary cooking step. This vessel may be of wood or any suitable material. It may have a pipe leading from the man-hole L out through the building, if desired, so as to carry off the steam. This opening should be sufficiently large, so as to prevent any material amount of accumulation of pressure or heat in vessel B.

M represents a coil provided with a series of orifices, i, for escaping the steam into the cooker B and heating the charge.

I have found by experience that the amount of steam which has escaped through the pipe h in the cooker A will parboil the grain and cook it sufficiently for the second step of the process. After this first step has been carried on in vessel B, the valve N in pipe O is opened and the charge is allowed to run out from vessel B into vessel A. A spout may be employed to lead from the pipe O through the man-hole I in vessel A.

P represents a water-pipe in vessel A for introducing water into said vessel when both the parboiling and high-pressure cooking of the grain are to be carried out therein. C represents a mashing-tub. The charge from vessel A through pipe E is admitted into the vessel C through pipe E'.

Q represents a pipe leading up through the building so as to carry off the steam.

n represents a steam-pipe inserted into pipe Q, with the end turned upward, through which steam may be introduced to blow off through the pipe and assist in carrying off the steam in vessel C, also causing a strong current of air which meets the descending mash and assists in cooling it while passing into the tub.

In the old form of mashes as large an amount of water as allowable is employed in cooking the mash, so as to prevent the mash from being too thick, and allowing it to be easily stirred and cooled. In carrying out my process of cooking, I use about eight to ten gallons of water to the bushel of grain in the two different stages of cooking. This water is introduced to the grain as soon as it is introduced into the cooker for the first step of the process. In the second step of the process of cooking, the charge is carried on without any additional amount of water. After the charge has been cooked and introduced into the mash-tub C, from six to ten gallons more of water to a bushel are introduced directly into the mash, so as to cool it down to the required temperature for the sugaring process. This process is economical, as the two different steps may be carried on simultaneously, and the charge cooked in from two to two and one-half hours, according to quality of grain, the primary process for next mash being carried on in vessel B, while the secondary process is being carried on in vessel A; however, both processes can be carried on in A, if desired.

This mode of employing the machinery herein shown effects a great saving in time and a large amount of labor in handling the product and a large saving of cooling water. Increase in the amount of sugar or spirits is obtained over the yield obtained by the cooking device of ground meal hitherto employed for this purpose. My cooking apparatus may be employed for cooking meal or grain coarse ground, and a material advantage gained over the ordinary cooking process hitherto employed in cooking meal; but the greatest advantage is obtained in cooking the grain unground, as I have described.

Care should be taken not to raise the heat in the second step of the process too high, so as to scorch the starch and destroy the saccharine or starch sugar, and to avoid injuring the spirits.

I have found by experience that forty-five pounds pressure to the square inch in the second step of the cooking process will produce the best effects, as it rapidly disintegrates the grain without injuring it by scorching.

Having described my invention, what I claim is—

In an apparatus for preparing grain for mashing, the combination of the vessel B, having interior steam-discharge pipes for producing a whirling motion of the grain, and water introduced into said vessel and parboiling said grain, a high-pressure steam-cooker having interior steam-jet pipes for producing a whirling of the mass while being cooked, and a mash-tub for receiving the charge from the cooker and cooling the same by water added thereto, substantially as described.

In testimony whereof I have hereunto set my hand.

LEO S. KUHN.

Witnesses:
EDWARD BOYD,
ROBERT ZAHNER.